US012794074B2

(12) United States Patent
Huang et al.

(10) Patent No.: US 12,794,074 B2
(45) Date of Patent: Nov. 10, 2026

(54) PRESSURE RELIEF MECHANISM, BATTERY CELL, BATTERY, ELECTRICAL DEVICE, AND PRESSURE RELIEF MECHANISM MANUFACTURING METHOD

(71) Applicant: CONTEMPORARY AMPEREX TECHNOLOGY (HONG KONG) LIMITED, Hong Kong (CN)

(72) Inventors: Shoujun Huang, Ningde (CN); Yulian Zheng, Ningde (CN); Peng Wang, Ningde (CN); Xinxiang Chen, Ningde (CN); Yanyu Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 778 days.

(21) Appl. No.: 18/303,017

(22) Filed: Apr. 19, 2023

(65) Prior Publication Data

US 2023/0261313 A1 Aug. 17, 2023

Related U.S. Application Data

(63) Continuation of application No. PCT/CN2021/121962, filed on Sep. 29, 2021.

(51) Int. Cl.
*H01M 50/342* (2021.01)
*H01M 50/249* (2021.01)
(Continued)

(52) U.S. Cl.
CPC ..... *H01M 50/3425* (2021.01); *H01M 50/375* (2021.01)

(58) Field of Classification Search
CPC ........... H01M 50/3425; H01M 50/249; H01M 2200/20; H01M 2220/20; H01M 50/103;
(Continued)

(56) References Cited

U.S. PATENT DOCUMENTS 4,404,982 A * 9/1983 Ou ........................ F16K 17/162 220/89.2
5,741,606 A * 4/1998 Mayer ................. H01M 50/578 429/57
(Continued)

FOREIGN PATENT DOCUMENTS

CN 107579172 A 1/2018
CN 208284541 U 12/2018
(Continued)

OTHER PUBLICATIONS

Notice of Final Rejection, KR application No. 10-2023-7015099, dated Jul. 25, 2025.
(Continued)

*Primary Examiner* — Lisa S Park
(74) *Attorney, Agent, or Firm* — Ladas & Parry, LLP

(57) ABSTRACT

A pressure relief mechanism is provided. The pressure relief mechanism is disposed on a housing plate of a battery cell, and including: a connecting portion, located in a peripheral region of the pressure relief mechanism, and configured to connect to the housing plate; a first part, where one end of the first part is connected to the connecting portion, and the other end of the first part extends obliquely toward an interior of the battery cell; a fragile portion, connected to the extending end of the first part; and a second part, taking a shape that protrudes toward the interior of the battery cell. An outer edge region of the second part is connected to the fragile portion. When an internal temperature or gas pressure of the battery cell is less than a preset value, the fragile portion is squeezed and pressed by the first part and/or the second part.

15 Claims, 18 Drawing Sheets

(51) Int. Cl.
*H01M 50/30* (2021.01)
*H01M 50/375* (2021.01)

(58) Field of Classification Search
CPC .. H01M 50/30; H01M 50/325; H01M 50/375; H01M 50/342; H01M 50/578; Y02E 60/10
See application file for complete search history.

(56) References Cited

U.S. PATENT DOCUMENTS

| | | | | |
|---|---|---|---|---|
| 2007/0154782 | A1* | 7/2007 | Cho | H01M 50/553 429/175 |
| 2008/0289945 | A1* | 11/2008 | Brazier | H01H 35/34 200/83 R |
| 2011/0104523 | A1 | 5/2011 | Lee et al. | |
| 2012/0225335 | A1* | 9/2012 | Naito | H01M 50/342 429/82 |
| 2016/0146363 | A1* | 5/2016 | Goggin | F16K 17/16 137/68.19 |

FOREIGN PATENT DOCUMENTS

| | | | |
|---|---|---|---|
| CN | 208848941 | U | 5/2019 |
| CN | 111668400 | A | 9/2020 |
| CN | 211578857 | U | 9/2020 |
| CN | 112382826 | A | 2/2021 |
| CN | 214068784 | U | 8/2021 |
| JP | S63060273 | U | 4/1988 |
| JP | 2010282580 | A | 12/2010 |
| JP | 2010282850 | A | 12/2010 |
| JP | 2011210485 | A | 10/2011 |
| JP | 2016516964 | A | 6/2016 |
| KR | 20110109794 | A | 10/2011 |

OTHER PUBLICATIONS

Decision to Grant a Patent for JP application No. 2023-519719, dated Aug. 6, 2024.
Extended European search report for EP application No. 21957719.4, dated Jul. 19, 2024.
Request for the Submission of an Opinion, KR application No. 10-2023-7015099, dated Nov. 21, 2024.
International Search Report for PCT application No. PCT/CN2021/121962, dated Jun. 24, 2022.
Written Opinion of The International Searching Authority for PCT application No. PCT/CN2021/121962, dated Jun. 24, 2022.
Notice of Reasons for Refusal for JP application No. 2023-519719, dated Apr. 16, 2024.

* cited by examiner

PRESSURE RELIEF MECHANISM, BATTERY CELL, BATTERY, ELECTRICAL DEVICE, AND PRESSURE RELIEF MECHANISM MANUFACTURING METHOD

CROSS REFERENCE TO RELATED APPLICATION

This application is a continuation of International Patent Application No. PCT/CN2021/121962, filed on Sep. 29, 2021, which is incorporated by reference in its entirety.

TECHNICAL FIELD

This application relates to the field of batteries, and in particular, to a pressure relief mechanism, a battery cell, a battery, an electrical device, and a pressure relief mechanism manufacturing method.

BACKGROUND

When a battery is overcharged or tested in a hot oven, or when an electrode plate of the battery is pierced by a metal conductor, or the like, heat and gas rapidly accumulate inside the battery, thereby increasing an internal air pressure, and even leading to battery expansion and explosion in severe cases.

Therefore, the battery is usually equipped with a pressure relief mechanism. When an internal gas pressure or temperature of the battery increases to a given level, the pressure relief mechanism is opened in time, and the internal gas is released by the pressure relief mechanism, thereby preventing the battery from exploding. In the prior art, even if the battery is in a normal operating state, the gas pressure inside the battery is less than a designed actuation pressure of the pressure relief mechanism, and the pressure relief mechanism sometimes fails, thereby shortening a lifespan of the pressure relief mechanism and impairing safety performance of the battery.

SUMMARY

Embodiments of this application provide a pressure relief mechanism, a battery cell, a battery, an electrical device, and a pressure relief mechanism manufacturing method, and can prevent the pressure relief mechanism from failing when a gas pressure is relatively low, ensure longevity of the pressure relief mechanism, and improve safety performance of the battery.

According to a first aspect, a pressure relief mechanism is provided. The pressure relief mechanism is disposed on a housing plate of a battery cell, and including: a connecting portion, located in a peripheral region of the pressure relief mechanism, and configured to connect to the housing plate; a first part, where one end of the first part is connected to the connecting portion, and the other end of the first part extends obliquely toward an interior of the battery cell; a fragile portion, connected to the extending end of the first part; and a second part, taking a shape that protrudes toward the interior of the battery cell, where an outer edge region of the second part is connected to the fragile portion. When an internal gas pressure or temperature of the battery cell is less than a first preset value, the fragile portion is squeezed and pressed by the first part and/or the second part.

In the pressure relief mechanism according to embodiments of this application, under the action of the internal gas pressure of the battery cell, the first part that extends obliquely toward the interior of the battery cell and the second part that takes the shape that protrudes toward the interior of the battery cell move away from the interior of the battery cell or have a tendency to move away from the interior of the battery cell. The first part is constrained by the connecting portion. Therefore, when the internal gas pressure or temperature of the battery cell is relatively small, specifically, less than the first preset value, an outline of the pressure relief mechanism on an inner side of the battery cell has a tendency to decrease in perimeter and shrink toward the center of the pressure relief mechanism. In this way, the fragile portion is squeezed and pressed by the first part and/or the second part, and can suppress cracking of the fragile portion, thereby preventing creep failure of the pressure relief mechanism under a condition of a relatively low gas pressure, and effectively extending the lifespan of the pressure relief mechanism.

In some embodiments, when the internal gas pressure or temperature of the battery cell further increases to a value greater than or equal to the first preset value, the first part and the second part move further away from the interior of the battery cell. In this way, the second part that takes the shape protruding toward the interior of the battery cell deforms into a shape protruding away from the interior of the battery cell. In this case, the fragile portion is stretched by the first part and/or the second part, and the fragile portion is stimulated to crack, thereby implementing rapid relief of pressure, and more effectively preventing the battery from exploding.

In some embodiments, a thickness of the first part is greater than or equal to a thickness of the second part. Because the second part is relatively thin and the first part is relatively thick, when the internal gas pressure or temperature of the battery cell further increases to a value greater than or equal to the first preset value, the second part more easily and rapidly changes to the shape protruding away from the interior of the battery cell, and deforms to a great extent while the first part deforms to a lesser extent, thereby stretching the fragile portion more effectively, stimulating the fragile portion to crack, implementing rapid pressure relief, and avoiding explosion of the battery.

In some embodiments, when the internal temperature or gas pressure of the battery cell is greater than or equal to a second preset value, the fragile portion is actuated so that the internal pressure of the battery cell is released by the pressure relief mechanism. To be specific, the second preset value is a burst pressure or temperature of the pressure relief mechanism. When the internal temperature or gas pressure of the battery cell is greater than or equal to the second preset value, the fragile portion is actuated to implement the pressure relief function.

In some embodiments, the second part further includes a middle region. The middle region is connected to the outer edge region. The middle region is basically parallel to a position in which the pressure relief mechanism is disposed on the housing plate.

Because the middle region is basically parallel to the end cap, the second part is prevented from deforming drastically, and is not prone to crack, thereby reducing the risk of actuation from a position other than the fragile portion.

In some embodiments, a thin-walled region is disposed in the second part.

The thin-walled region makes the second part more deformable under the action of the gas pressure. When the pressure relief mechanism is small in size and it is not easy to make the entire second part thin enough, the thin-walled region makes the second part more deformable and facilitate actuation of the fragile portion.

In some embodiments, a reinforcing structure is disposed in the first part.

The reinforcing structure increases strength of the first part, strengthens the support for the fragile portion, prevents unnecessary deformation of the first part, ensures that the first part effectively squeezes and presses the fragile portion under a relatively low gas pressure or temperature, suppresses cracking of the fragile portion, prevents the pressure relief mechanism from being actuated during normal operation of the battery cell, and effectively extends the lifespan of the pressure relief mechanism.

In some embodiments, the reinforcing structure includes a raised reinforcing rib disposed on one lateral surface of the first part.

The reinforcing rib can increase the thickness of a partial region of the first part, and increase strength of the first part.

In some embodiments, the reinforcing structure further includes a recessed portion disposed on the other lateral surface of the first part and located at a position corresponding to the reinforcing rib.

The recessed portion can improve the strength of the first part, and the reinforcing rib and the recessed portion can be formed by stamping, and are easy to manufacture.

In some embodiments, the connecting portion is annular, and includes two rectilinear portions and two arc portions that are connected to ends of the two rectilinear portions respectively. The reinforcing structure is located in the first part corresponding to the rectilinear portions.

Because the first part at a rectilinear portion is less stable than the first part at an arc portion, the strength of the first part can be increased more effectively by disposing the reinforcing structure at the position corresponding to the rectilinear portion.

In other words, the outline of the pressure relief mechanism is in the shape of a racetrack, thereby achieving a relatively large area for exhausting gas, and facilitating pressure relief.

In some embodiments, a thickness of at least a partial region of the fragile portion is less than a thickness of the first part and a thickness of the second part. In other words, the thickness of a part of the fragile portion is not reduced. Therefore, when the fragile portion is ruptured, the second part is prevented from flying out along with emissions such as airflow.

In some embodiments, the fragile portion is a groove. The groove structure can be formed by stamping and is easy to manufacture.

According to a second aspect, this application provides a battery cell, including the pressure relief mechanism according to the first aspect.

According to a third aspect, this application provides a battery, including the battery cell according to the second aspect.

According to a fourth aspect, this application provides an electrical device, including the battery according to the third aspect. The battery is configured to provide electrical energy.

According to a fifth aspect, a pressure relief mechanism manufacturing method is provided. The method includes: providing a connecting portion, and disposing the connecting portion in a peripheral region of a pressure relief mechanism, where the connecting portion is configured to connect to a housing plate; providing a first part, connecting one end of the first part to the connecting portion, and extending the other end of the first part obliquely toward an interior of the battery cell; providing a fragile portion, and connecting the fragile portion to the extending end of the first part; and providing a second part, where the second part takes a shape that protrudes toward the interior of the battery cell, and an outer edge region of the second part is connected to the fragile portion. When an internal temperature or gas pressure of the battery cell is less than a first preset value, the fragile portion is squeezed and pressed by the first part and/or the second part.

The foregoing description is merely an overview of the technical solutions of this application. The following expounds specific embodiments of this application to enable a clearer understanding of the technical means of this application, enable implementation thereof based on the content of the specification, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not intended to limit this application. In all the drawings, the same reference numeral represents the same component. In the drawings.

Figure 1:
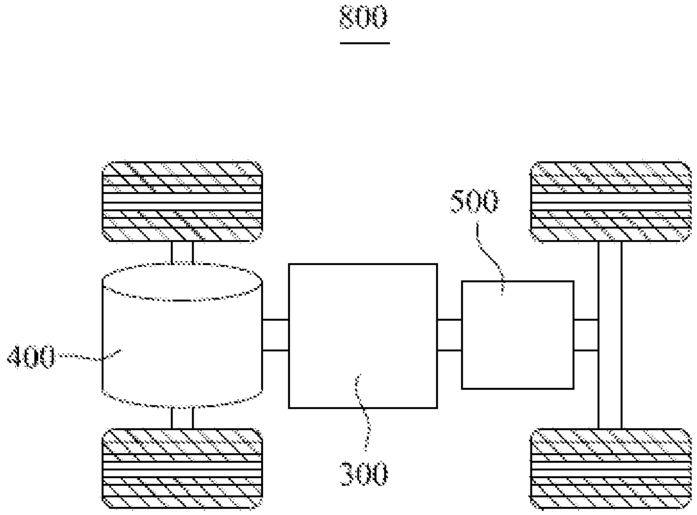
FIG. 1 is a schematic structural diagram of a vehicle according to some embodiments of this application.

REFERENCE NUMERALS battery cell 1;
end cap 10;
housing 20;
electrode terminal 30;
electrode assembly 40;
main body 41;
tab 42;
positive tab 421;
negative tab 422;
housing plate 50;
connecting member 60;
pressure relief mechanism 100;
connecting portion 101;
first part 102;
fragile portion 103;
second part 104;
outer edge region 1041;
middle region 1042;
thin-walled region 1043;
reinforcing structure 1021;
reinforcing rib 1021*b;*
recessed portion 1021*a;*
partial thickened portion 1021*c;*
rectilinear portion 1011; and
arc portion 1012.

Reference numbers in the comparative embodiment:
pressure relief mechanism 200;
connecting portion 201;
first part 202;
fragile portion 203;
second part 204;
controller 300;
motor 400, battery 500;
box 600;
upper box 601;
lower box 602; and
vehicle 800.

DETAILED DESCRIPTION

Embodiments of the technical solutions of this application are described in detail below with reference to the drawings. The following embodiments are merely intended to describe the technical solutions of this application more clearly, and serve merely as examples but without hereby limiting the protection scope of this application.

Unless otherwise defined, all technical and scientific terms used herein have the same meanings as commonly understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "I" herein generally indicates an "or" relationship between the item preceding the character and the item following the character.

"A plurality of" referred to in this application means two or more (including two). Similarly, "a plurality of groups" means two or more groups (including two groups), and "a plurality of pieces" means two or more pieces (including two pieces).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in a cylindrical shape, a flat shape, a cuboidal shape, or other shapes, without being limited in embodiments of this application. Depending on the form of packaging, the battery cell is typically classed into three types: cylindrical battery cell, prismatic battery cell, and pouch-type battery cell, without being limited in embodiments of this application.

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by relying on shuttling of metal ions between the positive electrode plate and the negative electrode plate. The positive electrode plate includes a positive current collector and a positive active material layer. A surface of the positive current collector is coated with the positive active material layer. Of the current collector, a part not coated with the positive active material layer protrudes from a part coated with the positive active material layer, and the part not coated with the positive active material layer serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the current collector, a part not coated with the negative active material layer protrudes from a part coated with the negative active material layer, and the part not coated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of polypropylene (PP), polyethylene (PE), or another material. In addition, the electrode assembly may be a jelly-roll structure or a stacked structure, without being limited herein.

The development of the battery technology needs to allow for a plurality of design factors, including performance parameters such as energy density, cycle life, discharge capacity, charge rate, and discharge rate, and also needs to ensure safety of the battery.

For a battery cell, main safety hazards come from a charging process and a discharging process. In addition, appropriate ambient temperature design is required. To effectively avoid unnecessary losses, the battery cell is generally protected by at least three protective measures. Specifically, the protective measures include at least a switch element, selecting an appropriate separator material, and a pressure relief mechanism. The switch element is an element that, when a temperature or resistance in the battery cell reaches a given threshold, causes the battery to stop charging or discharging. The separator is configured to separate the positive electrode plate from the negative electrode plate, and, when the temperature rises to a given value, automatically melt micron-scale (or even nanoscale) micropores attached to the separator, so as to prevent metal ions from passing through the separator and terminate internal reactions of the battery cell.

The pressure relief mechanism means an element or component that is actuated to relieve an internal pressure or temperature when the internal pressure or temperature of a battery cell reaches a preset threshold. The value of the threshold varies with the design requirement, and varies depending on the material of one or more of the positive electrode plate, the negative electrode plate, the electrolytic solution, or the separator in the battery cell. The pressure relief mechanism may be in the form of an explosion-proof valve, a gas valve, a pressure relief valve, a safety valve, or the like, and specifically, may be a pressure-sensitive or temperature-sensitive element or structure. When the internal pressure or temperature of the battery cell reaches a preset threshold, the pressure relief mechanism performs an action or a fragile structure disposed in the pressure relief mechanism is ruptured to form an opening or channel for relieving the internal pressure or temperature.

The term "actuated" mentioned in this application means that the pressure relief mechanism performs an action or is activated to a given state so that the internal pressure and temperature of the battery cell is relieved. The actions performed by the pressure relief mechanism may include, but are not limited to rupturing, shattering, tearing, or opening at least a part of the pressure relief mechanism, or the like. When the pressure relief mechanism is actuated, high-temperature and high-pressure substances inside the battery cell are expelled as emissions out of the actuated position. In this way, the pressure and temperature of the battery cell are relieved controllably to avoid potential severer accidents.

The emissions out of the battery cell mentioned in this application include but are not limited to: electrolytic solution, melted or split positive and negative electrode plates, fragments of the separator, high-temperature and high-pressure gases generated during reactions, flames, and the like.

The pressure relief mechanism on a battery cell plays an important role in battery safety. For example, in a case of a short circuit, overcharge, or the like, thermal runaway may occur inside the battery cell, resulting in a surge in pressure or temperature. In this case, the internal pressure and heat can be released outward by actuating the pressure relief mechanism, thereby preventing explosion and fire of the battery cell.

Even if a battery cell works normally, a gas pressure inside the battery cell is still exerted on the pressure relief mechanism. Although the gas pressure is lower than a lower limit of a designed initial actuation gas pressure, a grain boundary of the pressure relief mechanism slips under continuous action of the gas pressure and under the action of the internal temperature of the battery cell. Crystal grains diffuse along the grain boundary, eventually making the pressure relief mechanism thinner in structure, and reducing a pressure bearing capacity of the pressure relief mechanism. This may cause the pressure relief mechanism to fail due to a rupture triggered by a pressure lower than the preset actuation pressure.

In view of this, this application provides a pressure relief mechanism. The pressure relief mechanism includes a first part, one end of which extends obliquely toward an interior of the battery cell, and a second part that takes a shape protruding toward the interior of the battery cell. Under the action of the internal gas pressure and temperature of the battery cell, the second part moves away from the interior of the battery cell, but the first part is constrained by the connecting portion and has a tendency to move away from the interior of the battery cell. Therefore, when the internal gas pressure or temperature of the battery cell is relatively small, specifically, less than the first preset value, an outline of the pressure relief mechanism on an inner side of the battery cell has a tendency to decrease in perimeter and shrink toward the center of the pressure relief mechanism. In this way, the fragile portion is squeezed and pressed by the first part and/or the second part, and can suppress cracking of the fragile portion, thereby preventing cracking of the pressure relief mechanism under a condition of a relatively low gas pressure, and effectively extending the lifespan of the pressure relief mechanism.

Here, the first preset value is defined as a gas pressure or temperature value at which the first part and/or the second part changes from a state of squeezing and pressing the fragile portion to a state of stretching the fragile portion.

All technical solutions described in the embodiments of this application are applicable to various battery-powered devices such as a mobile phone, a portable device, a laptop computer, an electric power cart, an electrical toy, a power tool, an electric vehicle, a ship, and a spacecraft. The spacecraft includes, for example, an airplane, a rocket, a space shuttle, and a spaceship.

Understandably, the technical solutions described in embodiments of this application are not only applicable to the devices described above, but also applicable to all devices that use a battery. For brevity, the following embodiments are described by using an electric vehicle as an example.

The following describes specific embodiments of this application in detail.

FIG. 1 is a schematic structural diagram of a vehicle 800 according to an embodiment of this application. The vehicle 800 may be an oil-fueled vehicle, a natural gas vehicle, or a new energy vehicle. The new energy vehicle may be a battery electric vehicle, a hybrid electric vehicle, a range-extended electric vehicle, or the like. A motor 400, a controller 300, and a battery 500 may be disposed inside the vehicle. The controller 300 is configured to control the battery 500 to supply power to the motor 400. For example, the battery 500 may be disposed at the bottom, front, or rear of the vehicle. The battery 500 may be configured to supply power to the vehicle. For example, the battery 500 may serve as an operating power supply of the vehicle to power a circuit system of the vehicle 800. For example, the battery may be configured to meet operating power usage requirements of the vehicle 800 that is being started or navigated or running. In another embodiment of this application, the battery 500 serves not only as an operating power supply of the vehicle 800, but may also serve as a drive power supply of the vehicle 800 to provide driving power for the vehicle 800 in place of or partially in place of oil or natural gas.

To meet different power usage requirements, the battery may include a plurality of battery cells. The plurality of battery cells may be connected in series, parallel, or series-and-parallel pattern. The series-and-parallel pattern means a combination of series connection and parallel connection. The battery may also be referred to as a battery pack. Optionally, the plurality of battery cells may be connected in series, parallel, or series-and-parallel pattern to form a battery module, and then a plurality of battery modules may be connected in series, parallel, or series-and-parallel pattern to form the battery. In other words, the plurality of battery cells may directly form the battery, or form the battery modules that are then used to form the battery.

Figure 2:
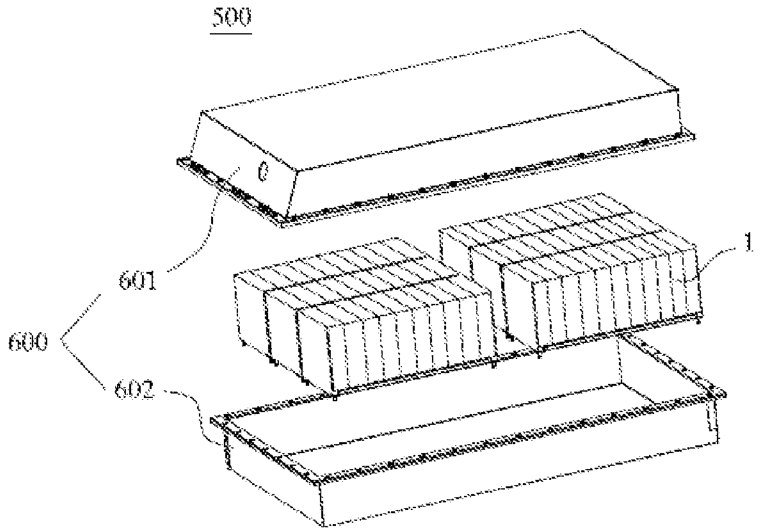
FIG. 2 is a schematic structural diagram of a battery according to some embodiments of this application.

FIG. 2 is a schematic structural diagram of a battery 500 according to an embodiment of this application. The battery 500 may include a plurality of battery cells 1. The battery 500 may further include a box 600 (or referred to as a container). The box 600 is a hollowed-out structure. A plurality of battery cells 1 are accommodated in the box 600. As shown in FIG. 2, the box 600 may include a upper box 601 and a lower box 602. The upper box 601 and the lower box 602 are snap-fitted together. The shapes of the upper box 601 and the lower box 602 may be determined depending on the shape of a combination of the plurality of battery cells 1. An opening is made on the upper box 601 and the lower box 602 separately. For example, both the upper box 601 and the lower box 602 may be a hollowed-out cuboid, and each includes one surface opened. The opening of the upper box 601 is disposed opposite to the opening of the lower box 602. The upper box 601 is snap-fitted to the lower box 602 to form a box with a closed chamber. The plurality of battery cells 1 are combined and connected in parallel, series, or series-and-parallel pattern, and then placed into the box that is formed by snap-fitting the upper box 601 and the lower box 602.

Depending on different power requirements, the number of battery cells 1 may be set to any value. A plurality of battery cells 1 may be connected in series, parallel, or series-and-parallel pattern to achieve a relatively high capacity or power. Each battery 500 may include a relatively large number of battery cells 1. Therefore, in order to facilitate mounting, the battery cells 1 may be arranged in groups. Each group of battery cells 1 forms a battery module. The number of battery cells 1 included in the battery module is not limited, and may be set as required. For example, the battery may include a plurality of battery modules. The battery modules may be connected in series, parallel, or series-and-parallel pattern.

Figure 3:
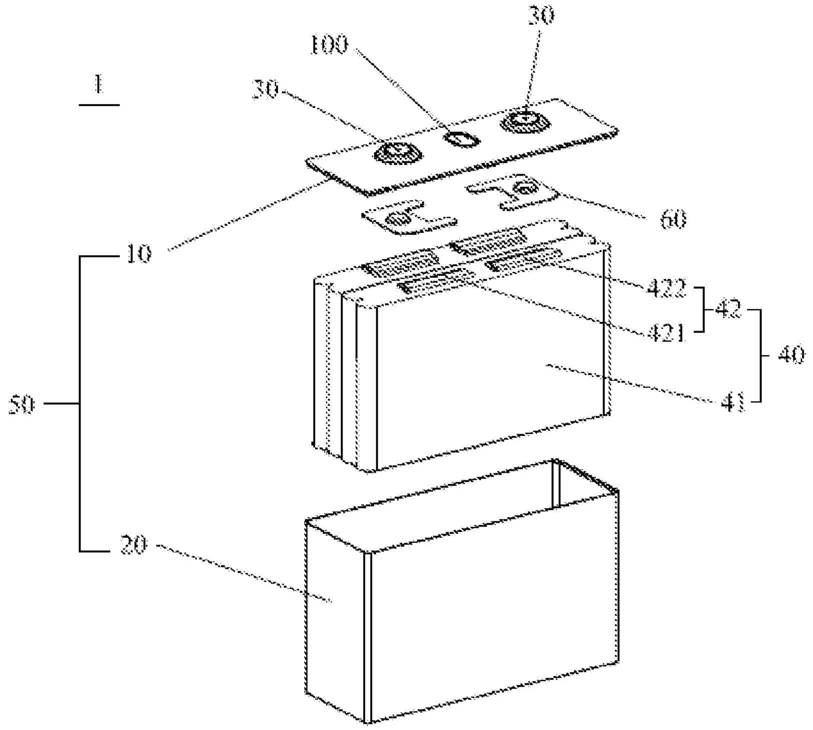
FIG. 3 is an exploded view of a battery cell according to some embodiments of this application.
Figure 4:
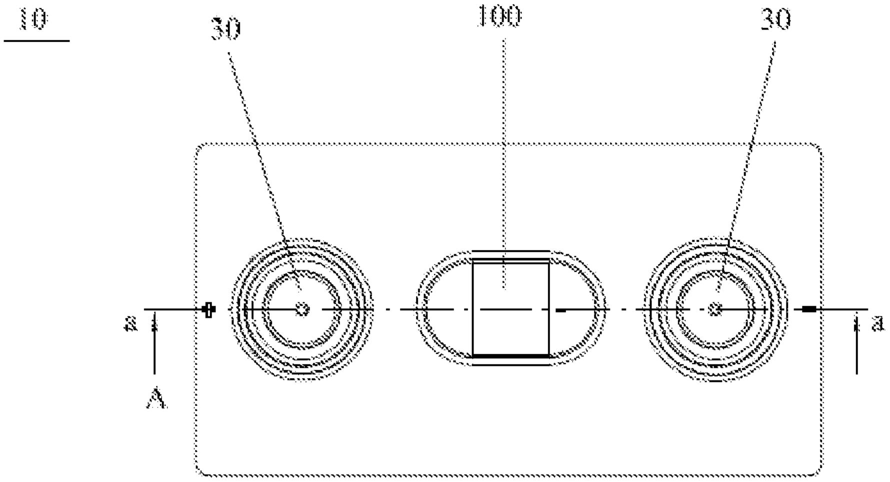
FIG. 4 is a front view of an end cap according to some embodiments of this application.
Figure 5:
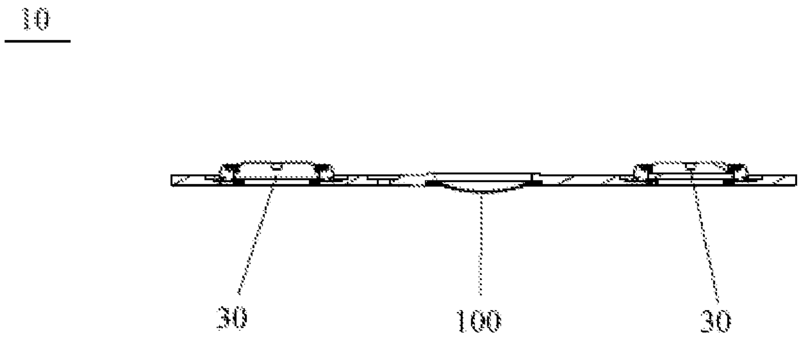
FIG. 5 is a sectional view of sectioning along a line A-A shown in FIG. 4.

FIG. 3 is an exploded view of a battery cell 1 according to some embodiments of this application. FIG. 4 is a top view of an end cap 10 according to some embodiments of this application. FIG. 5 is a sectional view of sectioning along a line a-a shown in FIG. 4, observed from a direction indicated by an arrow A;

As shown in FIG. 3, a battery cell 1 includes a housing plate 50 and an electrode assembly 40 disposed in the housing 20. The housing plate 50 includes an end cap 10 and a housing 20. An opening is made on the housing 20. The electrode assembly 40 is placed in the housing 20 through the opening of the housing 20. The electrode assembly 40 includes a body portion 41 and tabs 42. The tabs 42 extend from the body portion 41. The body portion 41 includes a positive electrode plate, a negative electrode plate, and a separator. The body portion 41 may be a jelly-roll structure formed by winding the positive electrode plate, the separator, and the negative electrode plate, or may be a stacked structure formed by stacking the positive electrode plate, the separator, and the negative electrode plate. A positive tab 421 and a negative tab 422 may be located on the same side of the body portion 41, or located on two opposite sides of the body portion 41 respectively. In FIG. 3, an example is shown in which the positive tab 421 and the negative tab 422 are located on the same side of the body portion 41. The end cap 10 covers the opening of the housing 20 to form a sealed space configured to accommodate the electrode assembly 40 and an electrolyte. The electrolyte may be an electrolytic solution.

As shown in FIG. 3, FIG. 4, and FIG. 5, in some embodiments, the pressure relief mechanism 100 is disposed at an approximately middle position on the end cap 10. However, depending on the arrangement and position of the electrode assembly, the pressure relief mechanism 100 may be disposed at another position on the housing plate 50 instead. Two electrode terminals 30 are further disposed on the end cap 10. The electrode terminals 30 are configured to electrically connect to the tabs 42, and are configured to output electrical energy of the battery cell 1 or configured to connect an external power supply to the battery cell for charging. The pressure relief mechanism 100 is located between the two electrode terminals 30. The battery cell 1 further includes a connecting member 60. The electrode terminals 30 are electrically connected to the tabs 42 by the connecting member 60.

Figure 6:
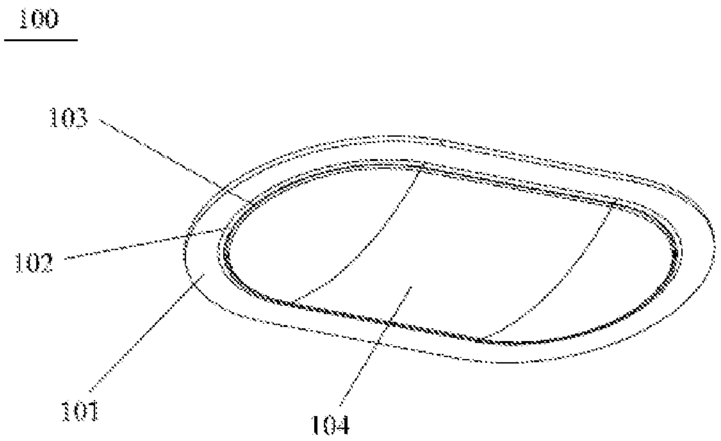
FIG. 6 is a three-dimensional view of a pressure relief mechanism according to some embodiments of this application.
Figure 7:
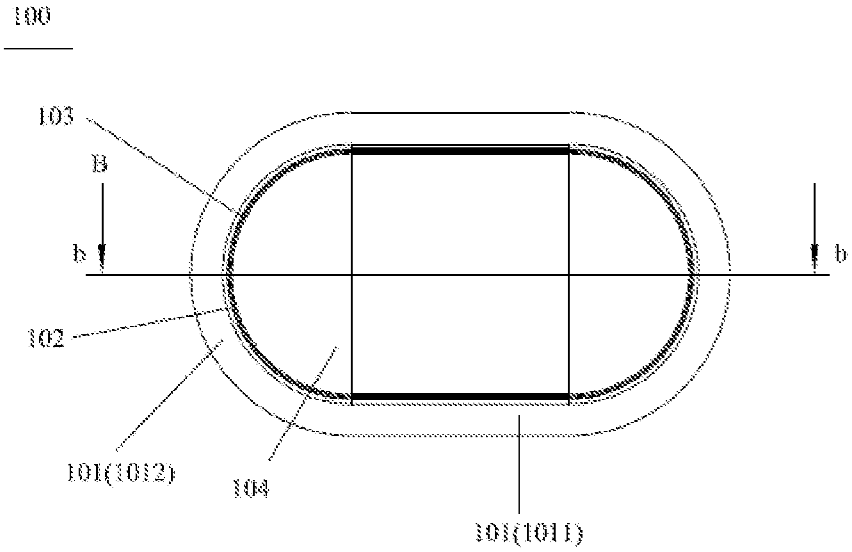
FIG. 7 is a view of the pressure relief mechanism shown in FIG. 6.
Figure 8:
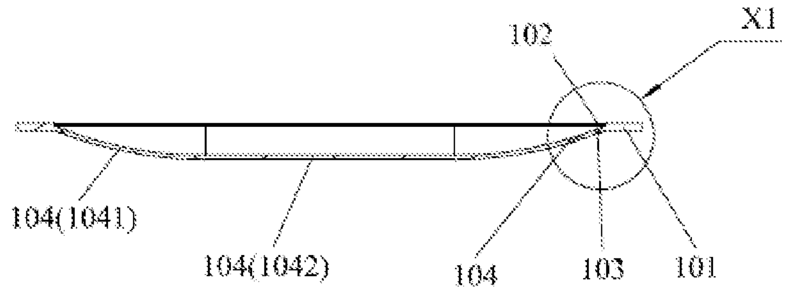
FIG. 8 is a sectional view of sectioning along a line b-b shown in FIG. 7.
Figure 9:
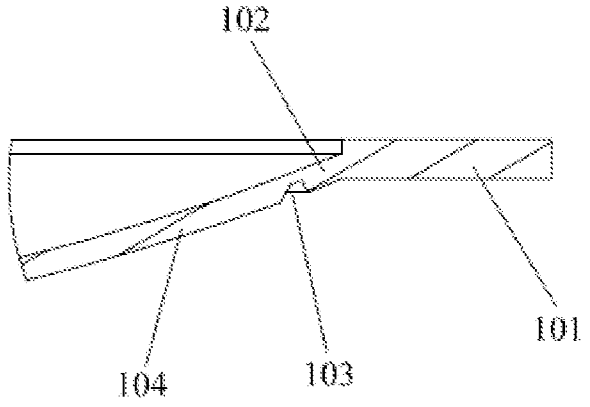
FIG. 9 is a close-up view of a region X1 shown in FIG. 8.

FIG. 6 is a three-dimensional view of a pressure relief mechanism 100 according to some embodiments of this application. FIG. 7 is a view of the pressure relief mechanism 100 observed from a side facing an interior of a battery cell. FIG. 8 is a sectional view of sectioning along a line b-b shown in FIG. 7, observed from a direction indicated by an arrow B; FIG. 9 is a close-up view of a region X1 shown in FIG. 8.

FIG. 6 to FIG. 9 show an initial state of the pressure relief mechanism 100, that is, a state in which no pressure is applied.

As shown in FIG. 6 to FIG. 9, the pressure relief mechanism 100 includes a connecting portion 101, a first part 102, a fragile portion 103, and a second part 104. The connecting portion 101 is located in a peripheral region of the pressure relief mechanism 100, and is configured to connect to the end cap 10 in FIG. 3, FIG. 4, and FIG. 5. In an embodiment, for example, as shown in FIG. 7, the connecting portion 101 includes two rectilinear portions 1011 and two arc portions 1012 that are connected to ends of the two rectilinear portions 1011 respectively, and the whole structure is in the shape of a racetrack.

As shown in FIG. 9, one end of the first part 102 is connected to the connecting portion 101, and the other end extends obliquely toward an electrode assembly 40 inside the battery cell 1, that is, a downward direction shown in FIG. 3. The fragile portion 103 is connected to the extending end of the first part 102. As shown in FIG. 6 and FIG. 8, the second part 104 takes a shape that protrudes toward the interior of the battery cell 1, and an outer edge region 1041 of the second part 104 is connected to the fragile portion 103. When the internal gas pressure or temperature of the battery cell 1 is less than a first preset value, the fragile portion 103 is squeezed and pressed by the first part 102 and/or the second part 104.

As shown in FIG. 9, the first part 102 as a whole is closer to the interior of the battery cell 1 than the connecting portion 101. The shape of the extending part of the first part 102 is not particularly limited. In this embodiment, as shown in FIG. 9, the first part 102 extends approximately rectilinearly toward the interior of the battery cell 1, but the first part 102 may extend in an arc shape or a curved shape instead.

The fragile portion 103 is located between the first part 102 and the second part 104, that is, located at the extending end of the first part 102, being closer to the interior of the battery cell 1 than the first part 102. The fragile portion 103 is less strong than the first part 102 and the second part 104. To relieve pressure, the fragile portion 103 is actuated.

As shown in FIG. 6, FIG. 7, and FIG. 8, the second part 104 is a part with the largest area in the pressure relief mechanism 100, and is located in the middle of the pressure relief mechanism 100, and includes an outer edge region 1041 and a middle region 1042 (referring to FIG. 8). One end of the outer edge region 1041 is connected to the fragile portion 103, and the other end is connected to the middle region 1042. The second part 104 as a whole is closer to the interior of the battery cell 1 than the fragile portion 103, and takes the shape that protrudes toward the interior of the battery cell 1. For example, the second part 104 takes an arch shape that protrudes toward the interior of the battery cell 1, but may protrude in an irregular shape instead. As shown in FIG. 8, the outer edge region 1041 of the second part 104 extends obliquely toward the interior of the battery cell in a direction that is approximately identical to the extending direction of the first part 102. The middle region 1042 is approximately parallel to the end cap 10 on which the pressure relief mechanism 100 is disposed.

Because the middle region 1042 is basically parallel to the end cap 10, the second part 104 is prevented from deforming drastically, and the second part 104 is not prone to crack, thereby reducing the risk of actuation from a position other than the fragile portion 103.

FIG. 10 to FIG. 18 show states of the pressure relief mechanism 100 under different gas pressures or temperatures according to this embodiment of this application.

Figure 10:
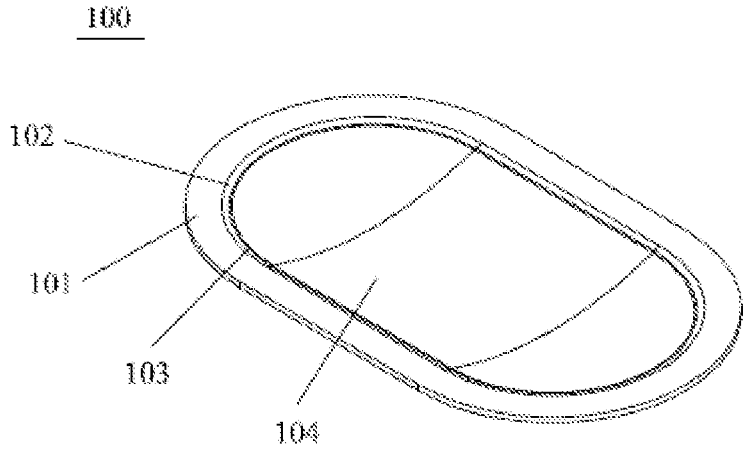
FIG. 10 is a three-dimensional view of a pressure relief mechanism when an internal gas pressure or temperature of a battery cell is less than a first preset value.
Figure 11:
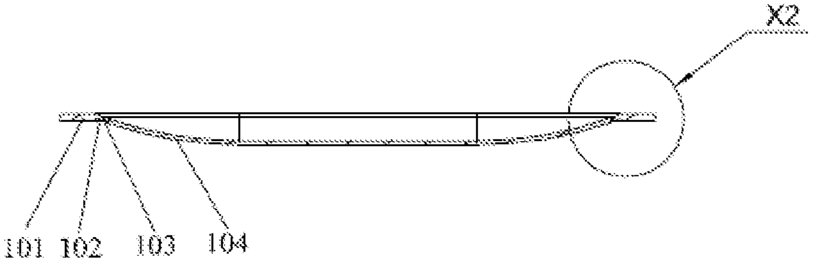
FIG. 11 is a sectional view of a pressure relief mechanism.
Figure 12:
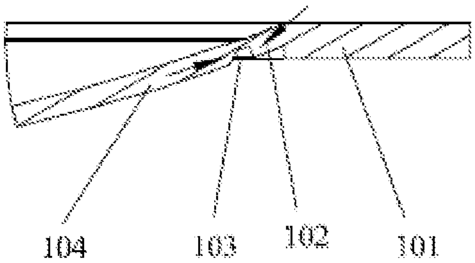
FIG. 12 is a close-up view of a region X2 shown in FIG. 11.

FIG. 10 is a three-dimensional view of a pressure relief mechanism 100 when an internal gas pressure or temperature of a battery cell 1 is less than a first preset value. FIG. 11 is a sectional view of the pressure relief mechanism 100 sectioned at the same position and observed from the same angle as FIG. 8. Refer to the description of FIG. 8. FIG. 12 is a close-up view of a region X2 shown in FIG. 11.

When the battery cell 1 works normally, the internal gas pressure or temperature of the battery cell 1 is relatively low. The following description uses gas pressure as an example. The internal gas pressure of the battery cell 1 keeps acting on the pressure relief mechanism 100, so that the first part 102, the fragile portion 103, and the second part 104 move upward or have a tendency to move upward. The entirety of the first part 102, the fragile portion 103, and the second part 104 decreases in outline perimeter and shrinks toward the center.

Specifically, as shown in FIG. 11 and FIG. 12, because the first part 102 tilts toward the interior of the battery cell 1, the position of the fragile portion 103 is closer to the interior of the battery cell than the connecting portion 101. That is, the position of the fragile portion 103 is closer to the interior of the battery cell than a position at which the pressure relief mechanism 100 is fixed to the end cap 10. In addition, because one end of the first part 102 is constrained by the connecting portion 101, the end that is of the first part 102 and that extends into the interior of the battery cell 1 squeezes and presses the fragile portion 103 along the arrow direction on the right side of FIG. 12, thereby suppressing the cracking of the fragile portion 103, preventing creep failure of the pressure relief mechanism 100 during normal operation of the battery cell 1, and effectively extending the lifespan of the pressure relief mechanism. Similarly, as shown in FIG. 12, the second part 104 moves upward under the action of the gas pressure. The second part 104 squeezes and presses the fragile portion 103 along the arrow direction on the left side of FIG. 12, thereby suppressing the cracking of the fragile portion 103, preventing creep failure of the pressure relief mechanism 100 during normal operation of the battery cell 1, and effectively extending the lifespan of the pressure relief mechanism 100.

Figure 13:
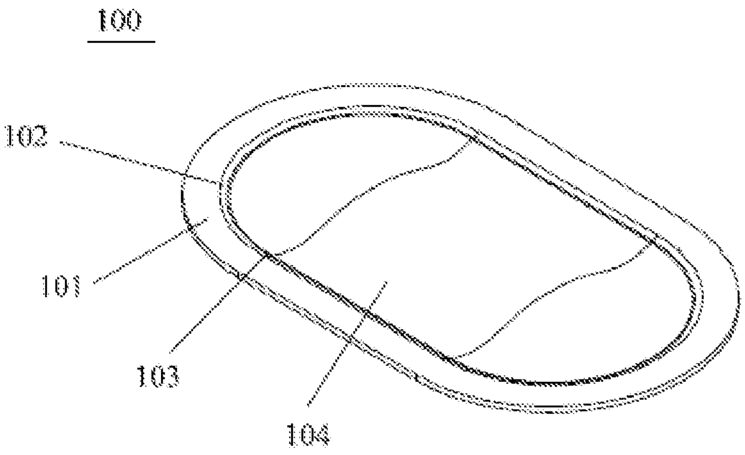
FIG. 13 is a three-dimensional view of a second part changed to a state of protruding upward when an internal gas pressure or temperature of a battery cell increases to a value greater than or equal to a first preset value.
Figure 14:
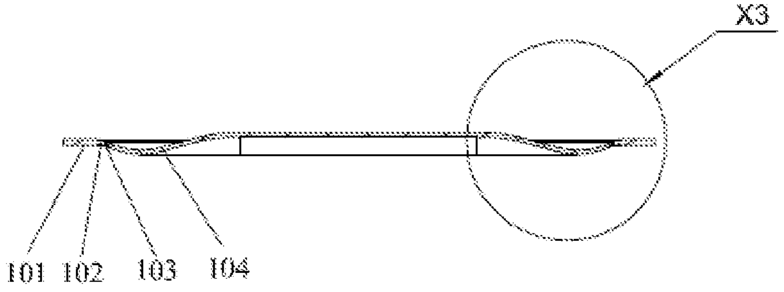
FIG. 14 is a sectional view of a pressure relief mechanism.
Figure 15:
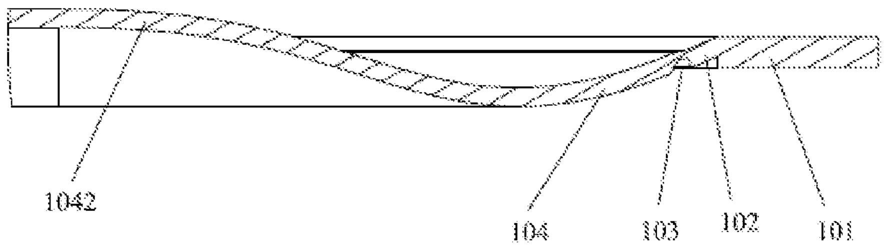
FIG. 15 is a close-up view of a region X3 shown in FIG. 14.

FIG. 13 is a status diagram that shows a process by which a second part 104 changes to a state of turning and protruding upward when the internal gas pressure or temperature of the battery cell 1 increases to a value greater than or equal to a first preset value. FIG. 14 is a sectional view of the pressure relief mechanism 100 sectioned at the same position and observed from the same angle as FIG. 8 and FIG. 11. FIG. 15 is a close-up view of a region X3 shown in FIG. 14.

As shown in FIG. 13 to FIG. 15, when the internal gas pressure or temperature of the battery cell 1 increases to a value greater than or equal to the first preset value, the first part 102, the fragile portion 103, and the second part 104 as a whole keep moving upward. The second part 104 deforms to a great extent, and turns up and changes from a down-protruding shape to an up-protruding shape. In this case, the middle region 1042 of the second part 104 moves to a position above the fragile portion 103. The first part 102 is constrained by the connecting portion 101, and moves very little. After the second part 104 is turned over, the second part 104 as a whole moves to a position above the fragile portion 103. The second part 104 changes from the state of squeezing and pressing the fragile portion 103 shown in FIG. 12 to the state of stretching the fragile portion 103, thereby stimulating the fragile portion 103 to crack, and helping to implement rapid pressure relief Here, the second preset value is defined as a preset temperature or pressure value at which the pressure relief mechanism 100 is actuated to release pressure. That is, when the internal temperature or pressure value of the battery cell 1 reaches the second preset value, the pressure relief mechanism 100 is actuated, for example, the fragile portion 103 cracks, so that the internal pressure of the battery cell 1 is released by the pressure relief mechanism 100.

Figure 16:
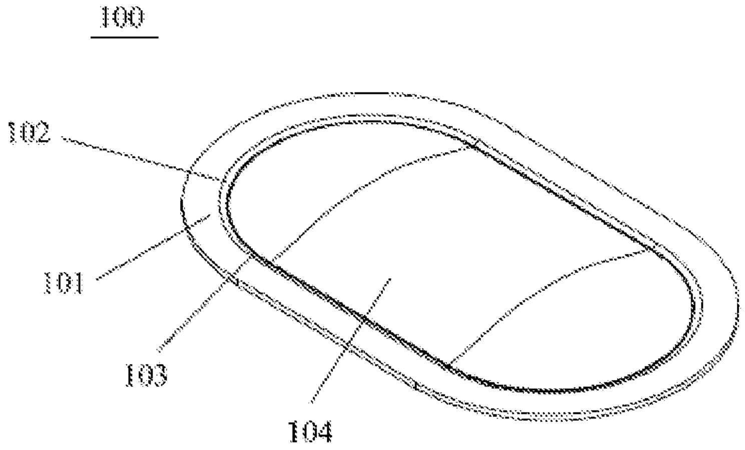
FIG. 16 is a three-dimensional view of a pressure relief mechanism that is about to rupture when an internal gas pressure or temperature of a battery cell increases to a value greater than or equal to a second preset value.
Figure 17:
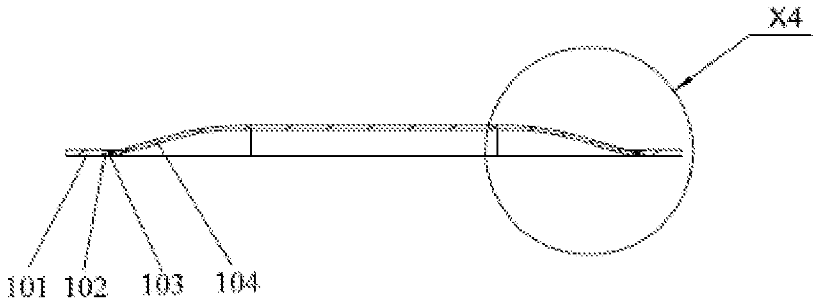
FIG. 17 is a sectional view of a pressure relief mechanism.
Figure 18:
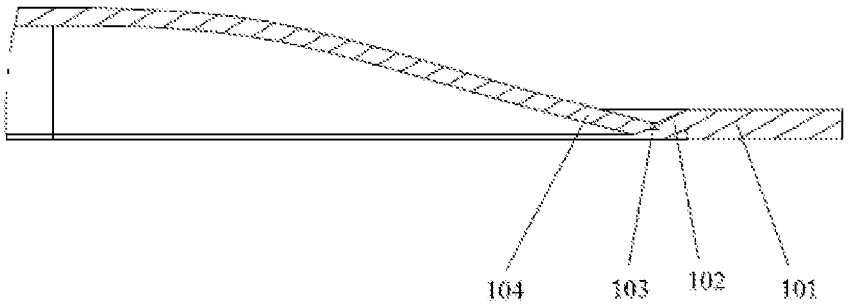
FIG. 18 is a close-up view of a region X4 shown in FIG. 17.

FIG. 16 is a three-dimensional view of a pressure relief mechanism 100 that is about to rupture when the internal gas pressure or temperature of the battery cell 1 increases to a value greater than or equal to the second preset value. FIG. 17 is a sectional view of the pressure relief mechanism 100 sectioned at the same position and observed from the same angle as FIG. 8, FIG. 11, and FIG. 14. FIG. 18 is a close-up view of a region X4 shown in FIG. 17.

As shown in FIG. 16 to FIG. 18, when the internal gas pressure or temperature of the battery cell 1 reaches the second preset value, the first part 102, the fragile portion 103, and the second part 104 as a whole keep moving upward, and exert a greater tensile force on the fragile portion 103. As constrained by the connecting portion 101, the first part 102 moves very little, so that the second part 104 and the first part 102 apply tension to the fragile portion 103 effectively, and the fragile portion 103 is ruptured to release the internal pressure of the battery cell 1.

Figure 19:
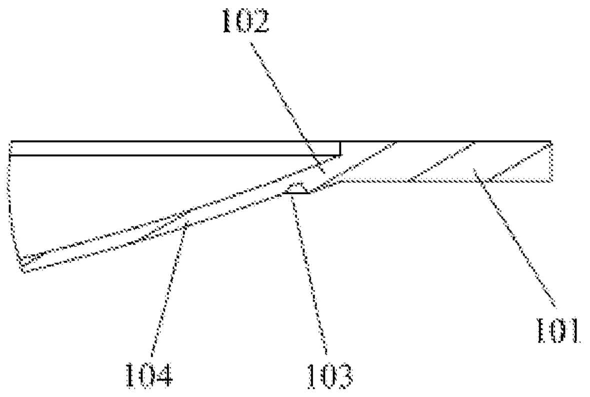
FIG. 19 is a close-up view of a part corresponding to a region X1 in a pressure relief mechanism according to some embodiments of this application, and shows a variation example of the pressure relief mechanism.

FIG. 19 shows a variation example of the pressure relief mechanism 100 shown in FIG. 9.

As shown in FIG. 19, in some embodiments, the thickness of the first part 102 is greater than or equal to the thickness of the second part 104.

Because the second part 104 is relatively thin and the first part 102 is relatively thick, when the internal gas pressure or temperature of the battery cell 1 increases, the relatively thin second part 104 more easily and rapidly changes to the shape protruding away from the interior of the battery cell 1, and deforms to a great extent while the relatively thick first part 102 deforms to a lesser extent. Therefore, the first part 102 and the second part 104 stretch the fragile portion 103 effectively, stimulate the fragile portion 103 to crack, implement rapid pressure relief, and prevent explosion of the battery effectively.

As an comparative embodiment, the following describes a pressure relief mechanism in the prior art.

Figure 20:
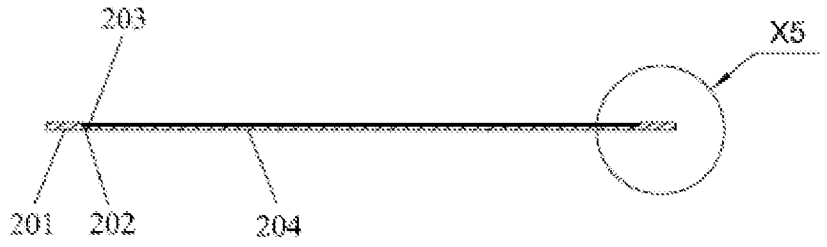
FIG. 20 shows a pressure relief mechanism in an initial state in the prior art.
Figure 21:
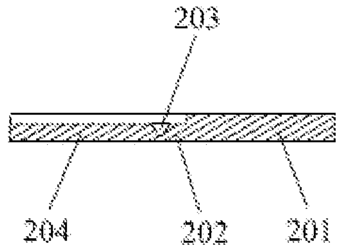
FIG. 21 is a close-up view of a region X5 shown in FIG. 20.

FIG. 20 is a sectional view of a pressure relief mechanism in the prior art, sectioned at the same position and observed from the same angle as FIG. 8. FIG. 21 is a close-up view of a region X5 shown in FIG. 20.

FIG. 20 to FIG. 21 show an initial state of the pressure relief mechanism 200, that is, a state in which no pressure is applied.

The pressure relief mechanism 200 in the prior art shown in FIG. 20 and FIG. 21 includes a connecting portion 201, a first part 202, a fragile portion 203, and a second part 204. The outline shape of the pressure relief mechanism 200 is set to be approximately identical to that of the pressure relief mechanism 100 according to this application. As shown in FIG. 20, the first part 202, the second part 204, and the connecting portion 201 are located on the same plane. The first part 202 of the pressure relief mechanism 200 does not extend toward the interior of the battery cell. The second part 204 takes no shape that protrudes toward the interior of the battery cell 1.

Figure 22:
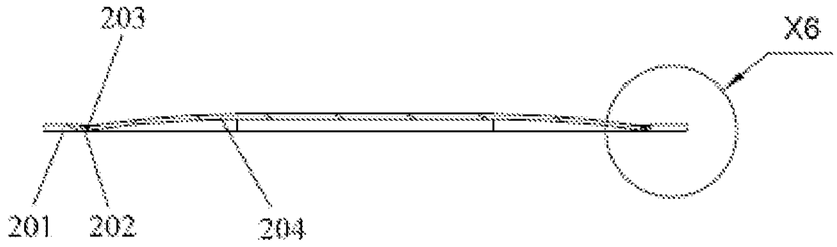
FIG. 22 shows a pressure relief mechanism in a state under a relatively low gas pressure in the prior art.
Figure 23:
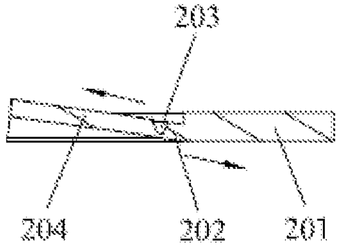
FIG. 23 is a close-up view of a region X6 shown in FIG. 22.

FIG. 22 shows status of a pressure relief mechanism 200 in the prior art under the action of a relatively low gas pressure (sectioned at the same position and observed from the same angle as FIG. 20). FIG. 23 is a close-up view of a region X6 shown in FIG. 22.

The pressure relief mechanism 200 withstands the internal gas pressure of the battery cell during normal operation of the battery cell. In this case, the first part 202 and the second part 204 move away from the interior of the battery cell. Under continuous action of the internal gas pressure of the battery cell, the first part 202 and the second part 204 continuously stretch the fragile portion 203 along the arrow direction in FIG. 23. Therefore, the fragile portion 203 is prone to crack under the action of just a relatively low gas pressure during normal operation of the battery cell.

Figure 24:
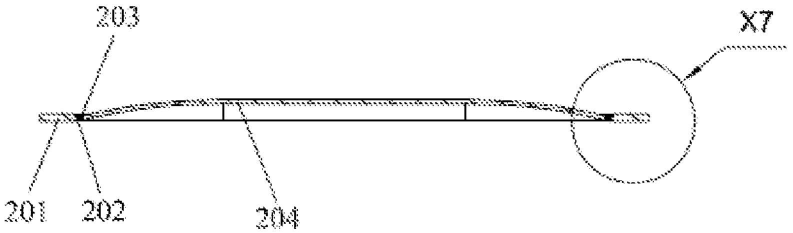
FIG. 24 shows a pressure relief mechanism in a cracked state in the prior art.
Figure 25:
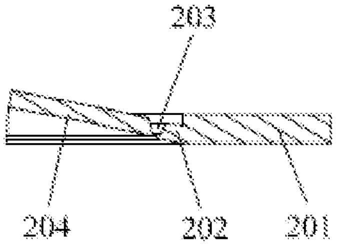
FIG. 25 is a close-up view of a region X7 shown in FIG. 24.

FIG. 24 shows a cracked state of a pressure relief mechanism in the prior art (sectioned at the same position and observed from the same angle as FIG. 20). FIG. 25 is a close-up view of a region X7 shown in FIG. 24.

The pressure relief mechanism 200 has withstood the internal gas pressure of the battery cell for a long time. The fragile portion 203 creeps as continuously stretched by the first part 202 and the second part 204. Therefore, the first part 202 and the second part 204 keep moving upward. Consequently, the fragile portion 203 is ruptured during normal operation of the battery cell, and the creep fails.

Figure 26:
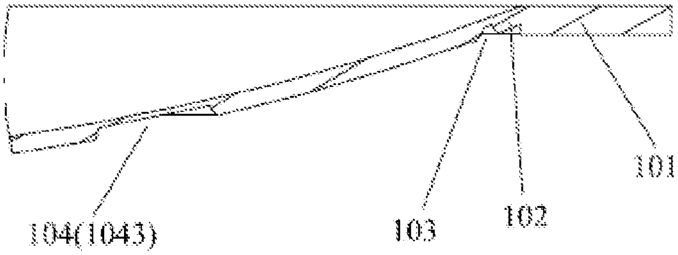
FIG. 26 is a close-up view of a pressure relief mechanism according to another embodiment of this application.

FIG. 26 is a close-up view of a sectional view of a pressure relief mechanism according to other embodiments of this application (sectioned at the same position and observed from the same angle as FIG. 8).

As shown in FIG. 26, a thin-walled region 1043 is disposed in the second part 104. The thickness of the thin-walled region 1043 is less than the thickness of other regions in the second part 104. In some embodiments, the thin-walled region 1043 is an annular groove that is opened toward the interior of the battery cell 1.

When the size of the pressure relief mechanism 100 is relatively small, the second part 104 needs to be thin enough to ensure that the second part 104 becomes protruding away from the interior of the battery cell 1 when the gas pressure or temperature is greater than or equal to the first preset value, so as to stimulate the fragile portion 103 to crack, and achieve the same pressure relief effect as a large-sized pressure relief mechanism. However, limited by manufacturing equipment and manufacturing process, the second part 104 can be hardly made thin enough. For such a purpose, a thin-walled region 1043 may be disposed in the second part 104. Under the action of gas pressure, the thin-walled region 1043 is more deformable than other regions of the second part 104. Therefore, the second part 104 can easily change to a state of protruding away from the interior of the battery cell 1.

The thin-walled region 1043 according to this application is not limited to the foregoing structure, and may be an annular groove that is opened away from the interior of the battery cell 1 instead. Alternatively, the annular groove may be disposed on both an upper surface and a lower surface of the second part 104. In addition, the shape of the thin-walled region 1043 is not particularly limited, and may be not annular, but an arc-shaped, rectilinear, or otherwise shaped. To ensure uniformity of withstanding the gas pressure, the thin-walled region 1043 is preferably arranged symmetrically in the second part 104. In addition, the number of thin-walled regions 1043 is not particularly limited, and may be appropriately set as required.

Figure 27:
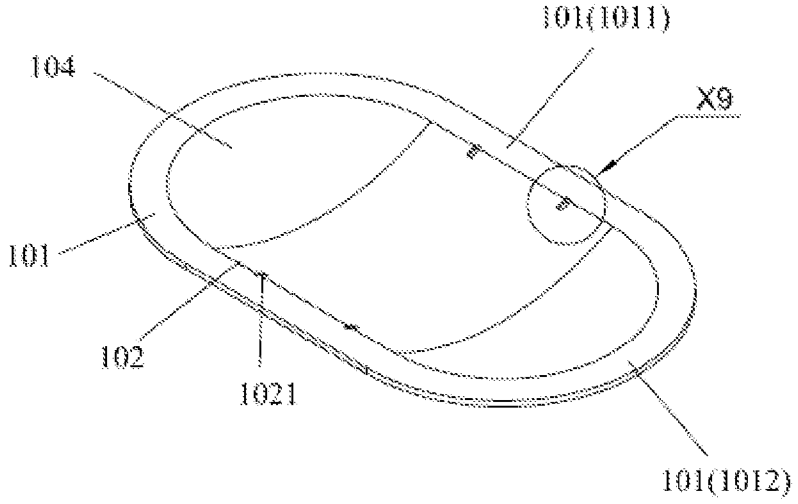
FIG. 27 is a three-dimensional view of a pressure relief mechanism according to other embodiments of this application.
Figure 28:
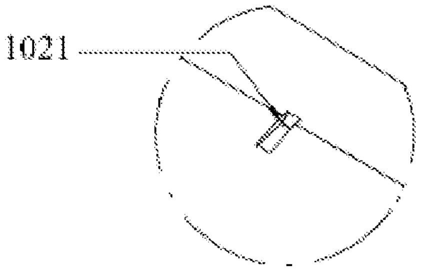
FIG. 28 is a close-up view of a region X9 shown in FIG. 27.

FIG. 27 is a view of a pressure relief mechanism 100 observed from a side away from the interior of the battery cell 1 according to other embodiments of this application. FIG. 28 is a close-up view of a region X9 shown in FIG. 27.

Figure 29:
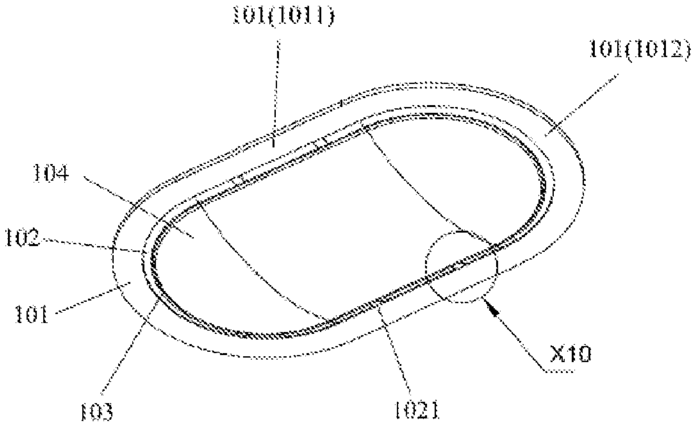
FIG. 29 is a three-dimensional view of a pressure relief mechanism shown in FIG. 27 in another direction.
Figure 30:
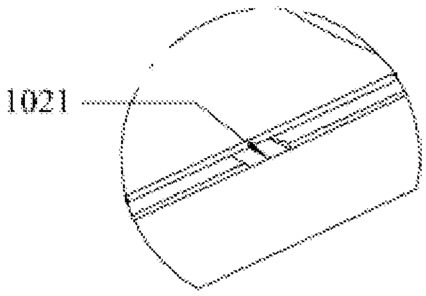
FIG. 30 is a close-up view of a region X10 shown in FIG. 29.

FIG. 29 is three-dimensional view of the pressure relief mechanism 100 shown in FIG. 27 observed from another side. FIG. 30 is a close-up view of a region X10 shown in FIG. 29.

Figure 31:
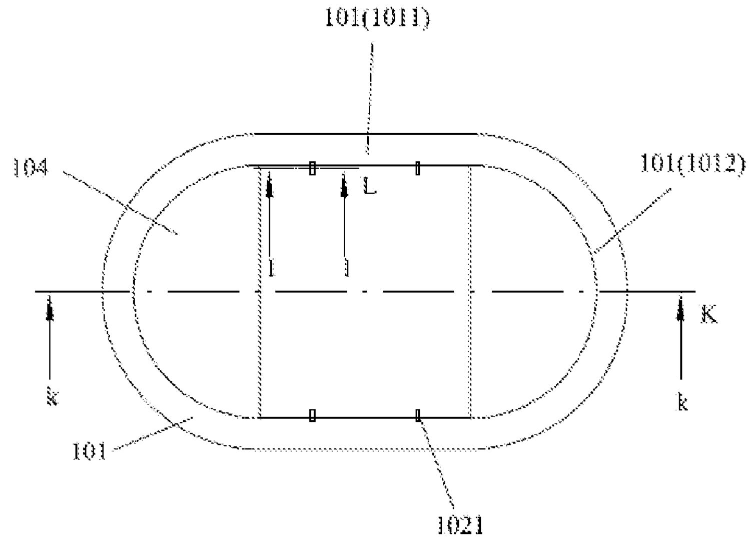
FIG. 31 is a front view of the pressure relief mechanism shown in FIG. 27 observed from a side oriented away from the battery cell.
Figure 32:
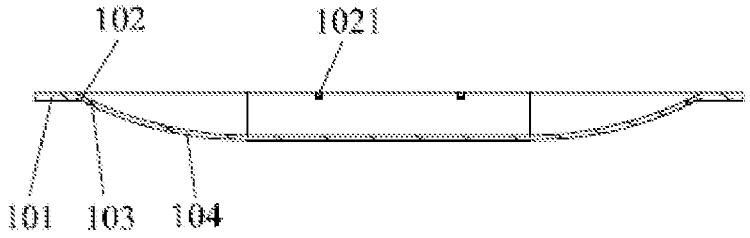
FIG. 32 is a sectional view of the pressure relief mechanism shown in FIG. 31.
Figure 33:
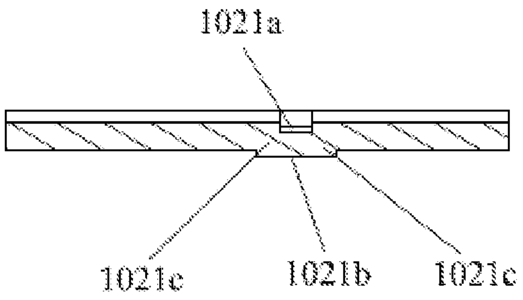
FIG. 33 is another sectional view of the pressure relief mechanism shown in FIG. 31.

FIG. 31 is a plan view of the pressure relief mechanism 100 shown in FIG. 27 observed from a side oriented away from the interior of the battery cell 1. FIG. 32 is a sectional view of the pressure relief mechanism 100 shown in FIG. 31 (sectioned at the same position and observed from the same angle as FIG. 8). FIG. 33 is a sectional view of the pressure relief mechanism 100 sectioned along a line 1-1 shown in FIG. 31, observed from a direction indicated by an arrow L.

In some embodiments, as shown in FIG. 27 to FIG. 30, a reinforcing structure 1021 is disposed in the first part 102.

For a pressure relief mechanism that is relatively large in size, because the area of the pressure relief mechanism 100 is relatively large, the pressure of the gas pressure is relatively high. The first part 102 moves greatly even when the gas pressure is relatively low, thereby making it ineffective to squeeze and press the fragile portion 103. If the thickness of the first part 102 is increased to prevent unnecessary deformation, the thickness difference between the first part and the fragile portion 103 is excessive, and it is difficult to form the fragile portion 103 of the desired thickness, resulting in an increase in the manufacturing cost. Therefore, the reinforcing structure 1021 increases strength of the first part 102 and is easy to process.

In some embodiments, as shown in FIG. 33, a protruding reinforcing rib **1021*b* is disposed on one lateral surface of the first part 102. The reinforcing rib 1021*b* may be disposed on a side of the first part 102, where the side is oriented away from the interior of the battery cell 1; or may be disposed on a side of the first part 102, where the side is oriented toward the interior of the battery cell 1**.

In some embodiments, a recessed portion **1021*a* is disposed on the other lateral surface of the first part 102 at a position corresponding to the reinforcing rib 1021*b*. Specifically, as shown in FIG. 33, the reinforcing rib 1021*b* and the recessed portion 1021*a* constitute a reinforcing structure 1021. In this embodiment, a depth of the recessed portion 1021*a* is greater than a protruding height of the reinforcing rib 1021*b*, and an opening width of the recessed portion 1021*a* (in the left-to-right direction in FIG. 33) is less than a width of the reinforcing rib 1021*b*. Therefore, two locally thickened regions 1021*c* are formed to the left and right sides of the recessed portion 1021*a*. The thickness of the locally thickened regions 1021*c* is greater than the thickness of other positions in the first part 102. Such a structure increases the strength of the first part 102 in the main force direction without increasing the overall volume of the first part 102. In addition, such a reinforcing structure 1021** can be formed by stamping, and is easy to manufacture.

As an alternative to the foregoing structure, the reinforcing structure 1021 may be a structure that increases strength by chemically treating a partial region of the first part 102.

In some embodiments, as shown in FIG. 27, FIG. 29, and FIG. 31, the connecting portion 101 is an annular plate-like structure, and may be connected to the end cap 10 by means such as welding. The welding position may be on the outer side of the end cap 10. When the first part 102 extends beyond the thickness of the end cap, the welding position may be on the inner side of the end cap 10. The connecting portion 101 includes two rectilinear portions 1011 and two arc portions 1012 that are connected to ends of the two rectilinear portions 1011 respectively. The reinforcing structure 1021 is located in the first part 102 corresponding to the rectilinear portions 1011. Because the first part 102 at a rectilinear portion 1011 is less stable than the first part 102 at an arc portion 1012, the strength of the first part 102 can be increased more effectively by disposing the reinforcing structure 1021 at the position corresponding to the rectilinear portion 1011. Definitely, the reinforcing structure 1021 may be disposed at a position corresponding to the arc portion 1012 as required. The two rectilinear portions 1011 are parallel to each other approximately. The connecting portion 101 formed by the two rectilinear portions 1011 and the two arc portions 1012 is in the shape of an annular racetrack as a whole.

Compared with a commonly used circular rupture disk, the connecting portion 101 according to this embodiment is in the shape of an annular racetrack. When the pressure relief mechanism 100 is applied to a small-sized battery cell, for a region of the same length and width, the gas exhausting area is wider during pressure relief, and the gas can be exhausted more quickly.

In some embodiments, the pressure relief mechanism 100 is arranged on the end cap 10 in the following manner: as shown in FIG. 4, the pressure relief mechanism 100 is located between two electrode terminals 30. Compared with the rectilinear portions, the two arc portions are close to the electrode terminals 30 on two sides of the pressure relief mechanism 100 respectively. More specifically, a connection line of arc midpoints of the two arc portions 1012 is colinear with a connection line of the two electrode terminals 30. For example, the connection line of the arc midpoints of the two arc portions 1012 and the connection line of the two electrode terminals 30 are both on the section line a-a shown in FIG. 4. In this way, in contrast to other arrangements, the pressure relief mechanism 100 deforms to the greatest extent under the action of stress. Definitely, the pressure relief mechanism 100 may be disposed in the way shown in FIG. 3 so that the rectilinear portions are closer to the electrode terminal 30.

In some embodiments, the thickness of at least a partial region of the fragile portion 103 is less than the thickness of the first part 102 and the thickness of the second part 104. In other words, not the thickness of all the fragile portion

103 is less than the thickness of the first part 102 and the thickness of the second part 104, but the thickness of just a part of the fragile portion 103 is less than the thickness of the first part 102 and the thickness of the second part 104. The thickness of other parts may be equal to or even greater than the thickness of the first part 102 and/or the thickness of the second part 104.

The thickness of a part of the fragile portion 103 is not reduced. Therefore, when the fragile portion 103 is ruptured, the second part 104 is prevented from flying out along with emissions such as airflow.

In some embodiments, the fragile portion 103 is a groove structure, for example, an annular groove structure that is opened toward the interior of the battery cell 1. In addition, the annular groove structure may include a plurality of intermittent grooves, so that the thickness of a partial region of the fragile portion 103 is less than the thickness of the first part 102 and the thickness of the second part 104.

Because the fragile portion 103 is a groove structure, the thickness and strength of the fragile portion 103 are less than those of the first part 102 and the second part 104, and the fragile portion 103 can be easily ruptured.

However, the fragile portion 103 is not limited to the groove structure, and may be any structure as long as the strength of the fragile portion 103 is less than the strength of the structures of the first part 102 and the second part 104. For example, the fragile portion 103 may be a structure softened and weakened by chemically treating the fragile portion 103.

The pressure relief mechanism 100 according to embodiments of this application has been described above.

Another aspect of this application further provides a battery 500, including the battery cell 1 described above.

Still another aspect of this application further provides an electrical device, including the battery 500 configured to provide electrical energy. Optionally, the electrical device may be a vehicle 800 shown in FIG. 1, or may be a watercraft or spacecraft.

This application further provides a pressure relief mechanism manufacturing method.

Figure 34:
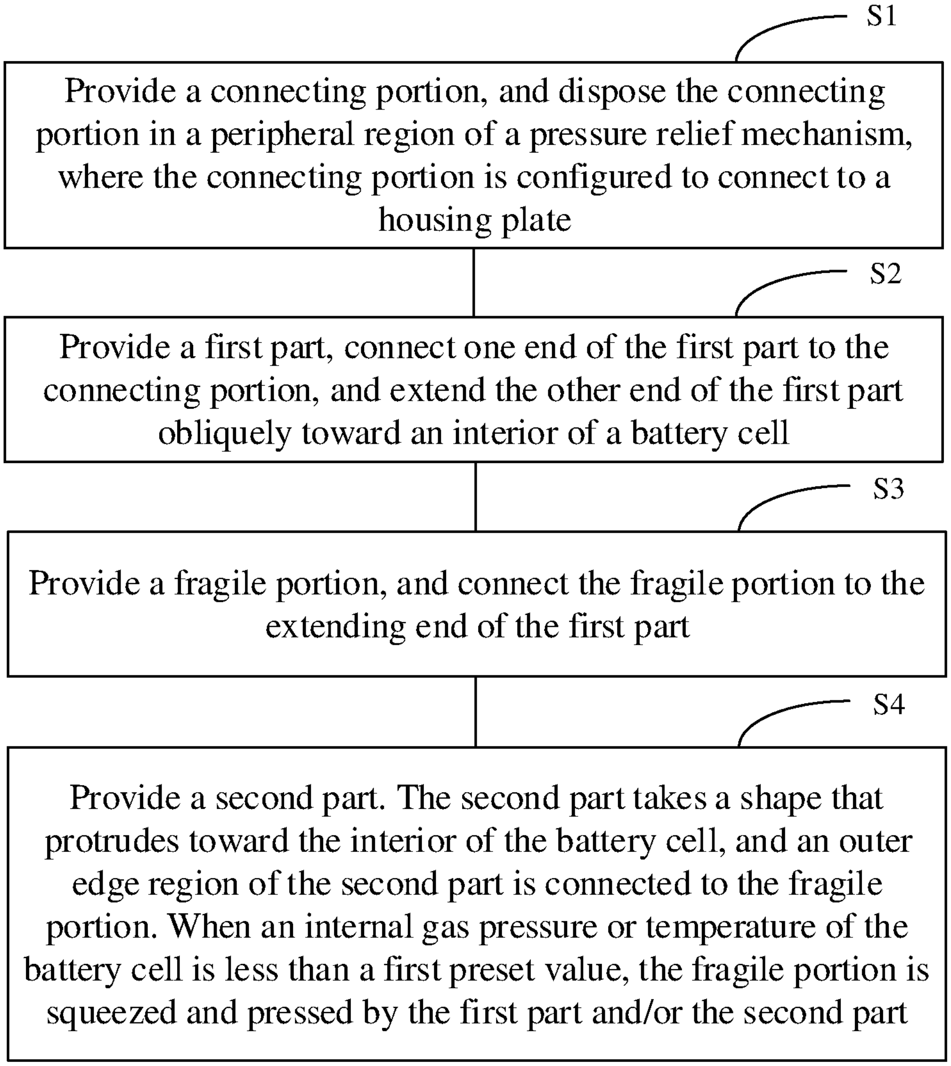
FIG. 34 is a schematic flowchart of a pressure relief mechanism manufacturing method according to some embodiments of this application.

FIG. 34 is a flowchart of a pressure relief mechanism 100 manufacturing method according to an embodiment of this application.

As shown in FIG. 34, the manufacturing method according to this embodiment includes the following steps:

Step S1: Provide a connecting portion 101, and dispose the connecting portion in a peripheral region of a pressure relief mechanism 100, where the connecting portion is configured to connect to an end cap 10;

Step S2: Provide a first part 102, connect one end of the first part to the connecting portion 101, and extend the other end of the first part obliquely toward an interior of a battery cell;

Step S3: Provide a fragile portion 103, and connect the fragile portion to the extending end of the first part 102; and Step S4: Provide a second part 104. The second part takes a shape that protrudes toward the interior of the battery cell, and an outer edge region of the second part is connected to the fragile portion 103. When the internal gas pressure or temperature of the battery cell is less than a first preset value, the fragile portion 103 is squeezed and pressed by the first part 102 and/or the second part 104.

More specifically, the connecting portion 101, the first part 102, and the second part 104 are integrally formed by a mold using a metal material. For example, the metal material is aluminum foil, copper foil, and the like. In this case, the first part 102 and the second part 104 are not distinguished in appearance. The whole first part 102 and second part 104 are stamped, cut, or the like, so that a groove-shaped fragile portion 103 is formed at a preset position, so as to obtain the pressure relief mechanism 100 shown in FIG. 6 to FIG. 10.

By selecting appropriate materials, setting the thickness of the first part 102, the extending length of the first part 102, the area of the second part 104, the thickness of the second part 104, the thickness of the fragile portion 103, and other parameters, the following effect is achieved: the fragile portion 103 is squeezed and pressed by the first part 102 and the second part 104 when the internal gas pressure or temperature of the battery cell is less than the first preset value. Specific settings of parameters depend on the actual conditions such as the size of the pressure relief mechanism, details of which are omitted herein.

In an exemplary embodiment, the thickness of the first part 102 is set to a value greater than or equal to the thickness of the second part 104. For example, this can be achieved by adjusting the shape of a mold.

In an exemplary embodiment, a thin-walled region 1043 shown in FIG. 26 is disposed in the second part 104 to facilitate deformation of the second part 104. The thin-walled region 1043 may be formed by stamping or cutting the second part 104, or may be integrally formed together with the second part 104 by setting the shape of a mold.

In an exemplary embodiment, a reinforcing structure 1021 shown in FIG. 27 to FIG. 32 is disposed in the first part 102 to support the fragile region 103. The reinforcing structure 1021 may be formed by stamping the first part 102, or may be integrally formed together with the first part 102 by setting the shape of a mold.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A pressure relief mechanism, disposed on a housing plate of a battery cell, and comprising:

a connecting portion, located in a peripheral region of the pressure relief mechanism, and configured to connect to the housing plate;

a first part, wherein one end of the first part is connected to the connecting portion, and an other end of the first part extends obliquely toward an interior of the battery cell;

a fragile portion, connected to the extending end of the first part; and a second part, taking a shape that protrudes toward the interior of the battery cell, wherein an outer edge region of the second part is connected to the fragile portion, wherein a thickness of the first part is greater than a thickness of the second part;

wherein when an internal temperature or gas pressure of the battery cell is less than a first preset value, the fragile portion is squeezed and pressed by the first part and/or the second part;

wherein a reinforcing structure is disposed in the first part, to reduce a deformation of a first peripheral portion of the first part when an internal temperature or gas pressure of the battery cell changes, where said first peripheral portion of the first part would otherwise deform faster than a second peripheral portion of the first part when an internal temperature or gas pressure of the battery cell changes.

2. The pressure relief mechanism according to claim 1, wherein when the internal temperature or gas pressure of the battery cell is greater than or equal to the first preset value, the second part changes the shape from protruding toward the interior of the battery cell to protruding away from the interior of the battery cell, and the fragile portion is stretched by the second part and/or the first part.

3. The pressure relief mechanism according to claim 1, wherein when the internal temperature or gas pressure of the battery cell is greater than or equal to a second preset value, the fragile portion is actuated so that the internal pressure of the battery cell is released by the pressure relief mechanism.

4. The pressure relief mechanism according to claim 1, wherein the second part further comprises a middle region, the middle region is connected to the outer edge region, and the middle region is substantially parallel to a position in which the pressure relief mechanism is disposed on the housing plate.

5. The pressure relief mechanism according to claim 1, wherein a thin-walled region is disposed in the second part.

6. The pressure relief mechanism according to claim 1 wherein the reinforcing structure comprises a raised reinforcing rib disposed on a first lateral surface of the first part.

7. The pressure relief mechanism according to claim 6, wherein the reinforcing structure further comprises a recessed portion disposed on a second lateral surface of the first part and located at a position corresponding to the reinforcing rib.

8. The pressure relief mechanism according to claim 6, wherein the connecting portion is annular, and comprises two rectilinear portions and two arc portions that are connected to ends of the two rectilinear portions respectively, wherein said first peripheral portion of the first part comprises the rectilinear portions and said second peripheral portion of the first part comprises the arc portions.

9. The pressure relief mechanism according to claim 1, wherein a thickness of at least a partial region of the fragile portion is less than a thickness of the first part and a thickness of the second part.

10. The pressure relief mechanism according to claim 1, wherein the fragile portion is a groove.

11. A battery cell, comprising the pressure relief mechanism according to claim 1.

12. A battery, comprising the battery cell according to claim 11.

13. An electrical device, comprising the battery according to claim 12, wherein the battery is configured to provide electrical energy.

14. A method for manufacturing a pressure relief mechanism, comprising:

providing a connecting portion, and disposing the connecting portion in a peripheral region of the pressure relief mechanism, wherein the connecting portion is configured to connect to a housing plate;

providing a first part, connecting one end of the first part to the connecting portion, and extending an other end of the first part obliquely toward an interior of the battery cell;

providing a fragile portion, and connecting the fragile portion to the extending end of the first part; and providing a second part, wherein the second part takes a shape that protrudes toward the interior of the battery cell, and an outer edge region of the second part is connected to the fragile portion, wherein a thickness of the first part is set to a value greater than a thickness of the second part;

wherein when an internal temperature or gas pressure of the battery cell is less than a first preset value, the fragile portion is squeezed and pressed by the first part and/or the second part;

the method further comprising disposing a reinforcing structure in the first part, to reduce a deformation of a first peripheral portion of the first part when an internal temperature or gas pressure of the battery cell changes, where said first peripheral portion of the first part would otherwise deform faster than a second peripheral portion of the first part when an internal temperature or gas pressure of the battery cell changes.

15. The method according to claim 14, wherein a thin-walled region is disposed in the second part to facilitate deformation of the second part.

* * * * *